United States Patent
Paasikallio et al.

(10) Patent No.: US 11,492,556 B2
(45) Date of Patent: Nov. 8, 2022

(54) ENHANCING CO-PROCESSING OF LIGNOCELLULOSE PYROLYSIS OIL BY ENHANCING ITS COMPATIBILITY WITH TYPICAL OIL REFINERY HYDROCARBON FEED

(71) Applicant: Neste Oyj, Espoo (FI)

(72) Inventors: Ville Paasikallio, Porvoo (FI); Blanka Toukoniitty, Porvoo (FI); Jukka-Pekka Pasanen, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/627,131

(22) PCT Filed: Jun. 28, 2018

(86) PCT No.: PCT/EP2018/067383
§ 371 (c)(1),
(2) Date: Dec. 27, 2019

(87) PCT Pub. No.: WO2019/002445
PCT Pub. Date: Jan. 3, 2019

(65) Prior Publication Data
US 2020/0181502 A1    Jun. 11, 2020

(30) Foreign Application Priority Data

Jun. 29, 2017 (EP) .................................. 17178808
Dec. 29, 2017 (FI) .................................. 20176185

(51) Int. Cl.
| | |
|---|---|
| *C10G 1/00* | (2006.01) |
| *C10G 3/00* | (2006.01) |
| *C10G 11/02* | (2006.01) |
| *C10L 1/04* | (2006.01) |

(52) U.S. Cl.
CPC .............. *C10G 3/42* (2013.01); *C10G 1/002* (2013.01); *C10G 3/00* (2013.01); *C10G 11/02* (2013.01); *C10L 1/04* (2013.01); *C10G 2300/1011* (2013.01); *C10G 2300/1014* (2013.01); *C10G 2300/1033* (2013.01); *C10G 2300/1048* (2013.01); *C10G 2300/1074* (2013.01); *C10G 2300/202* (2013.01); *C10G 2300/4006* (2013.01); *C10G 2400/02* (2013.01); *C10L 2200/0438* (2013.01); *C10L 2200/0469* (2013.01); *C10L 2200/0484* (2013.01); *C10L 2270/023* (2013.01); *C10L 2290/543* (2013.01)

(58) Field of Classification Search
None
See application file for complete search history.

(56) References Cited

U.S. PATENT DOCUMENTS

| | | | |
|---|---|---|---|
| 4,876,108 | A | 10/1989 | Underwood et al. |
| 5,308,470 | A | 5/1994 | Blackburn et al. |
| 5,395,455 | A | 3/1995 | Scott et al. |
| 5,961,786 | A | 10/1999 | Freel et al. |
| 7,479,217 | B2 | 1/2009 | Pinault et al. |
| 2006/0127305 | A1 | 6/2006 | Pinault et al. |
| 2014/0296592 | A1 | 10/2014 | Zhu et al. |
| 2014/0316176 | A1 | 10/2014 | Fjare et al. |
| 2015/0005548 | A1 | 1/2015 | Freel et al. |
| 2016/0046873 | A1 | 2/2016 | Räsänen et al. |
| 2016/0090539 | A1 | 3/2016 | Frey et al. |
| 2016/0130509 | A1* | 5/2016 | Nousiainen ............ C10G 45/58 585/324 |
| 2016/0168481 | A1 | 6/2016 | Ray et al. |
| 2016/0244677 | A1 | 8/2016 | Froehle |
| 2016/0289576 | A1 | 10/2016 | Eilos |
| 2017/0190991 | A1 | 7/2017 | Sundberg et al. |

FOREIGN PATENT DOCUMENTS

| | | |
|---|---|---|
| CA | 2951614 A1 | 2/2017 |
| CN | 101080481 A | 11/2007 |
| CN | 104073292 A | 10/2014 |
| FI | 20156043 A | 7/2017 |
| WO | 2012062924 A1 | 5/2012 |
| WO | 2014001633 A1 | 1/2014 |
| WO | 2015055896 A1 | 4/2015 |

OTHER PUBLICATIONS

International Search Report and Written Opinion issued in corresponding International Patent Application No. PCT/FI2018/050501, dated Sep. 13, 2018. (11 pages).
U.S. Appl. No. 16/627,689, "Process for Increasing Gasoline and Middle Distillate Selectivity in Catalytic Cracking" by Ville Paasikallio, et al., filed on Dec. 30, 2019.
Office Action dated Aug. 19, 2020, by the Finnish Patent Office in corresponding Finnish Patent Application No. 20176185. (4 pages).
European Search Report dated Nov. 24, 2017.
Finnish Search Report dated Jun. 13, 2018.
International Search Report (PCT/ISA/210) dated Jul. 30, 2018, by the European Patent Office as the International Searching Authority for International Application No. PCT/EP2018/067383.
Office Action dated Apr. 16, 2021, by the Canadian Patent Office in corresponding Canadian Patent Application No. 3,068,168. (4 pages).
Office Action dated May 31, 2021, by the Chinese Patent Office in corresponding Chinese Patent Application No. 201880055312.9. (9 pages).
Office Action dated Nov. 2, 2021, by the Canadian Patent Office in corresponding Canadian Patent Application No. 3,068,168. (4 pages).
Office Action dated Jan. 18, 2022, by the Chinese Patent Office in corresponding Chinese Patent Application No. 2018800553129. (3 pages).
Office Action issued on Jul. 15, 2022, by the Brazilian Patent Office in corresponding Brazilian Patent Application No. BR112019028206-8, and an English Translation of the Office Action. (8 pages).

* cited by examiner

*Primary Examiner* — Philip Y Louie

(74) *Attorney, Agent, or Firm* — Buchanan Ingersoll & Rooney PC

(57) ABSTRACT

The present disclosure relates to co-processing at least a fossil-based feed, pyrolysis liquid and a distillation residue from tall oil distillation in an oil refinery conversion process.

19 Claims, No Drawings

ENHANCING CO-PROCESSING OF LIGNOCELLULOSE PYROLYSIS OIL BY ENHANCING ITS COMPATIBILITY WITH TYPICAL OIL REFINERY HYDROCARBON FEED

TECHNICAL FIELD

The present invention relates to a process for enhancing co-processing of lignocellulose pyrolysis oil by enhancing its compatibility with typical fossil-based oil refinery feed. Specifically, the invention relates to a process for enhancing co-processing of lignocellulose pyrolysis oil in catalytic cracking facilities, in hydrocracking facilities and/or in hydrotreatment facilities.

TECHNICAL BACKGROUND

Mobility and logistics are an essential part of life, economy and society today. To meet the growing energy needs of traffic and transport it is important to seek sustainable fuel solutions. A fuel can be considered sustainable when the well-to-wheels impact on the ecological and social environment is the lowest possible. Decarbonizing the transport sector is a major challenge and fossil fuels should slowly be replaced by more sustainable fuels. Liquid fuel has benefits compared to gases and electricity in traffic solutions due to existing infrastructure and fuel logistics. The energetic content of liquid fuels is also superior, which is essential since energy needs to be carried on-board in vehicles.

Typical oil refinery conversion processes designed for converting light or heavy hydrocarbon streams into fuel range hydrocarbon streams are commonly employed in the art in order to increase the yield of transportation fuel and other valuable components derived from crude fossil oil. For example, catalytic cracking (fluidized and thermal) of heavy hydrocarbon streams such as vacuum gas oil (VGO) produces a wide array of products which range from gaseous $C_1$-$C_2$ hydrocarbons to solid carbonaceous coke on the catalyst surface. Within the distillate product range that falls between these two extremes, compounds boiling in the gasoline and middle distillate range are valuable in the preparation of transportation fuels. Distillate products from catalytic cracking exhibit varying degrees of saturation— paraffins, olefins, naphthenes and aromatics are all present in the product mixture. While the relative amount of hydrogen in these products varies, all molecules include a structural backbone consisting of carbon-carbon bonds. Thus, it is clearly beneficial to design and operate the cracking process in a manner which ensures that the carbon that goes into the process is also directed to the most desirable products with a high selectivity.

The prior art has made various attempts to employ renewable raw materials in conventional oil refinery conversion processes, such as hydrotreating, hydrocracking and catalytic cracking, to increase the total content of renewable material in fuel products. Many of these attempts focus on co-processing pyrolysis liquid (pyrolysis oil), which is derived by pyrolysis of renewable material (e.g. plant material), with conventional (fossil) streams in an oil refinery conversion process.

For example, US 2016/0168481 A1 discloses fluid catalytic cracking (FCC) of pyrolysis oil stream together with a hydrocarbon stream, such as diesel stream, and a surfactant. US 2016/0244677 A1 mentions FCC of a mixture of pyrolysis oil as a first feedstock and a petroleum oil as a second feedstock. FCC of pyrolysis oil together with a petroleum-based HC stream is disclosed in US 2016/0090539 A1. US 2015/0005548 A1 discloses FCC of a renewable fuel oil (pyrolysis oil) and a petroleum fraction feedstock. In WO 2012/062924 A1 co-processing of pyrolysis oil with a hydrocarbon stream in FCC is mentioned. US 2014/0316176 A1 discloses a FCC method of co-processing pyrolysis liquid and a hydrocarbon feed using an emulsifier.

SUMMARY OF THE INVENTION

Lignocellulosic residues represent large raw material potential for production of renewable fuels. They represent a sustainable, non-food and non-ILUC opportunity for renewable fuels. According to the European Environment Agency, the total bioenergy potential from agriculture, forestry and waste is about 300 MToe in 2030 in EU-27. The potential of waste other than lignocellulosics is about 100 MToe, agricultural products amount to about 142 MToe (47% from total) and about 27-50 MToe are derived from forestry depending on the type of environmental constraints and stimulation measures implemented.

The present inventors considered that more sustainable fuels can be produced by increasing the amount of renewable fuel components in fuels, in particular in transportation fuels. More specifically, sustainable fuels should contain a high amount of non-food and non-ILUC renewable fuel components.

The prior art tries to solve this problem by co-processing renewable pyrolysis liquid (PL; sometimes also referred to as pyrolysis oil) with a fossil-based feed, such as vacuum gas oil, to produce valuable fuel components (boiling in the gasoline and middle distillate range) containing a certain amount of bio-derived carbon.

PL as renewable feedstock contains less carbon than fossil-based feeds, such as VGO. Specifically, the carbon content of PL is usually less than 50 wt.-% (wet basis, i.e. including water). Refining pure PL with common oil refinery conversion methods (e.g. cracking and/or hydrotreatment) is highly challenging due to its adverse physical properties and reactivity, and thus the prior art employs a co-feed to handle these problems.

However, co-processing of renewable PL is challenging as well, because the PL exhibits limited compatibility with the common co-feeds, such as VGO. The prior art therefore developed various methods to avoid mixing problems or to increase compatibility using additives (such as surfactants), so as to prepare a mixture, a solution, an emulsion, or the like.

The present inventors surprisingly found that the compatibility between PL and a conventional (fossil-based) feed can be significantly increased by adding another biogenic feed derived from tall oil (specifically a distillation residue from tall oil distillation, such as tall oil pitch, TOP). Based on this finding, the inventors completed the present invention.

The present invention is defined in the independent claims. Further beneficial embodiments are set forth in the dependent claims. Specifically, the present invention relates to one or more of the following items:

1. A process comprising co-processing at least a fossil-based feed, pyrolysis liquid (PL) and a distillation residue from tall oil distillation in an oil refinery conversion process.

2. The process according to item 1, wherein the distillation residue from tall oil distillation is tall oil pitch (TOP).

3. The process according to any of the preceding items, wherein the pyrolysis liquid is derived from a cellulose-containing raw material.

4. The process according to any of the preceding items, wherein the fossil-based feed is an optionally pre-treated crude oil distillation fraction, gas oil (GO), vacuum gas oil (VGO), Fischer-Tropsch wax, or mixture of at least two thereof.

5. The process according to any of the preceding items, wherein the ratio of the pyrolysis liquid to the distillation residue (pyrolysis liquid:distillation residue) is in the range of 5:1 to 1:19 by weight, preferably 4:1 by weight or lower, 2:1 by weight or lower, or 1:1 by weight or lower.

6. The process according to any of the preceding items, wherein the ratio of the pyrolysis liquid to the distillation residue (pyrolysis liquid:distillation residue) is 1:7 by weight or higher, preferably 1:5 by weight or higher, 1:4 by weight or higher or 1:3 by weight or higher.

7. The process according to any of the preceding items, wherein the total content of the pyrolysis liquid and the distillation residue is in the range of 1.0 to 80.0 wt.-% based on the whole feedstock.

8. The process according to any of the preceding items, wherein the total content of the pyrolysis liquid and the distillation residue is at most 50.0 wt.-%, preferably at most 40.0 wt.-% or at most 30.0 wt.-%.

9. The process according to any of the preceding items, wherein the total content of the fossil-based feed, the pyrolysis liquid and the distillation residue is in the range of 10.0 to 100.0 wt.-% based on the whole feedstock, preferably at least 50.0 wt.-%, at least 70.0 wt.-%, at least 80.0 wt.-%, at least 90.0 wt.-%, or at least 95.0 wt.-%.

10. The process according to any of the preceding items, wherein the ratio of the pyrolysis liquid to the fossil-based feed (pyrolysis liquid:fossil-based feed) is in the range of 5:1 to 1:20 by weight, preferably 2:1 by weight or lower, 1:1 by weight or lower, or 1:2 by weight or lower.

11. The process according to any of the preceding items, wherein the ratio of the pyrolysis liquid to the fossil-based feed (pyrolysis liquid:fossil-based feed) is 1:15 by weight or higher, preferably 1:12 by weight or higher, 1:10 by weight or higher or 1:8 by weight or higher.

12. The process according to any of the preceding items, wherein the PL, the fossil-based feed and the distillation residue are introduced into an oil refinery conversion reactor, in which the oil refinery conversion process is carried out, using different feeding lines.

13. The process according to any of the preceding items, wherein at least two of the PL, the fossil-based feed and the distillation residue are introduced into an oil refinery conversion reactor, in which the oil refinery conversion process is carried out, using the same feeding line.

14. The process according to any of the preceding items, wherein the PL and the distillation residue are introduced into an oil refinery conversion reactor, in which the refinery conversion reactor process is carried out, using the same feeding line and the fossil-based feed is introduced using a different feeding line.

15. The process according to item 13 or 14, wherein the PL and the distillation residue are mixed in advance in a mixing vessel and then introduced into the oil refinery conversion reactor.

16. The process according to any of items 13 to 15, wherein a part of one or both of the PL and the distillation residue is further individually introduced into the oil refinery conversion reactor using a separate feeding line.

17. The process according to any of the preceding items, wherein the oil refinery conversion process comprises altering the molecular weight of the feed, removal of heteroatoms from the feed, altering the degree of saturation of the feed, rearranging the molecular structure of the feed, or any combination thereof.

18. The process according to any of the preceding items, wherein the oil refinery conversion process comprises a catalytic cracking process.

19. The process according to any of the preceding items, wherein the oil refinery conversion process comprises a hydrotreating process.

20. The process according to any of the preceding items, wherein the oil refinery conversion process comprises a hydrocracking process.

21. The process according to any of the preceding items, wherein the oil refinery conversion process is a catalytic cracking process which is carried out in the presence of a solid catalyst to provide a cracking product.

22. The process according to item 21, wherein the catalytic cracking process is carried out in a catalytic cracking reactor, preferably in a continuous reactor.

23. The process according to item 21 or 22, wherein the solid catalyst is a particulate catalyst.

24. The process according to any one of items 21 or 23, wherein the solid catalyst is an acidic catalyst.

25. The process according to any one of items 21 or 24, wherein the solid catalyst is a zeolite-based catalyst.

26. The process according to any of items 21 to 25, wherein the catalytic cracking process is carried out at a temperature in a range of 400° C. to 600° C.

27. The process according to any of items 21 to 26, wherein the catalytic cracking process is carried out at a temperature of 420° C. or more, preferably 440° C. or more, 450° C. or more, 460° C. or more, or 470° C. or more.

28. The process according to any of items 21 to 27, wherein the catalytic cracking process is carried out at a temperature of 570° C. or less, preferably 550° C. or less, 540° C. or less, 530° C. or less, 525 or less, or 520° C. or less.

29. The process according to any of items 21 to 28, wherein the catalytic cracking process is carried out as a continuous process, preferably in a transported bed reactor or in a fluidized bed reactor and/or as a fluid catalytic cracking (FCC) process.

30. The process according to any of items 21 to 29, wherein the catalyst-to-oil-ratio (in the catalytic cracking step) is 3 or more, preferably 4 or more, or 5 or more.

31. The process according to any of items 21 to 30, wherein the catalyst-to-oil-ratio (in the catalytic cracking step) is 20 or less, preferably 15 or less, or 10 or less.

32. The process according to any of the preceding items, further comprising the step of fractionating the product of the oil refinery conversion process to provide at least a gasoline fraction and a middle distillate fraction.

33. A fuel component obtainable by a process of any of the preceding items.

34. The fuel component according to item 33, comprising a fraction of a product obtainable by the process of any of items 17 to 20 or 32, wherein the fraction is preferably a fraction boiling in the gasoline range, or a fraction boiling in the middle distillate range.

35. A mixture comprising at least a fossil-based material, a pyrolysis liquid and a distillation residue from tall oil distillation.

36. A use of an oil refinery conversion product (refined product) or of a fraction thereof obtainable by the process according to any one of items 1 to 32 for producing a fuel or a fuel component.

37. A method comprising producing an oil refinery conversion product (refined product) according to the process of any one of items 1 to 32, optionally fractionating the refined product to provide a refined product fraction, and blending the refined product or the refined product fraction with another fuel component to provide a fuel.

DETAILED DESCRIPTION OF THE INVENTION

The invention is now explained in detail and with reference to specific embodiments. It is to be noted that any feature of the embodiments may be combined with any feature of another embodiment provided that such a combination does not result in a contradiction.

The present invention relates to a process comprising co-processing at least a fossil feed, PL and a distillation residue from tall oil distillation in an oil refinery conversion process.

The oil refinery conversion process may be any suitable conversion process commonly employed in the field of fuel production. Most suitably, the oil refinery conversion process is a catalytic cracking process, a hydrocracking process and/or a hydrotreatment process that has conditions suitable for hydrodeoxygenation (HDO) reactions to take place. Particularly preferred is an oil refinery conversion process in which catalytic cracking takes place, or alternatively a process in which hydrotreatment (preferably at least HDO) is combined with at least hydrocracking.

In the present invention, PL is a pyrolysis product from a renewable source and is preferably non-hydrotreated. The PL may contain water. Unprocessed PL usually contains water and the PL employed in the process of the present invention may be unprocessed PL.

The pyrolysis liquid of the present invention is a liquid obtained by pyrolysis of bio-derived material, preferably derived from non-food and non-ILUC material. The process of the present invention may optionally comprise a step of carrying out pyrolysis to prepare the PL or the PL may be provided from any suitable source, e.g. from a commercial source. The pyrolysis liquid is preferably a liquid obtained by pyrolysis, which has essentially not been pre-treated or upgraded by hydrotreatment and/or hydrodeoxygenation. A hydrotreatment and/or hydrodeoxygenation to substantially reduce the oxygen content of the pyrolysis liquid can advantageously be avoided in the processes according to the invention.

The bio-derived material which is subjected to pyrolysis to provide the PL of the present invention preferably comprises a cellulosic material, more preferably a lignocellulosic material. Hence, preferably, the pyrolysis liquid is a pyrolysis liquid derived from a cellulosic material, more preferably from a lignocellulosic material.

Any suitable cellulose-containing material may be used as bio-derived material in the pyrolysis. The cellulosic material may be obtained from a variety of plants and plant materials including agricultural wastes, forestry wastes, sugar processing residues and/or mixtures thereof. Examples of suitable cellulose-containing materials include agricultural wastes such as corn stover, soybean stover, corn cobs, rice straw, rice hulls, oat hulls, corn fibre, cereal straws such as wheat, barley, rye and oat straw; grasses; forestry products such as wood and wood-related materials such as sawdust; waste paper; sugar processing residues such as bagasse and beet pulp; or mixtures thereof. In a more preferred embodiment the pyrolysis liquid is obtained by pyrolysis of wood and/or a wood-related material, such as forestry residue, wood chips and/or saw dust. In another preferred embodiment, the wood and/or wood-related material contains bark and/or needles. Most preferably the pyrolysis liquid is obtained by pyrolysis of wood and/or a wood-related material containing pine wood or forestry residue.

The pyrolysis liquid of the present invention is derived from a renewable material and is preferably derived from a cellulose-containing raw material, specifically from a lignocellulose-based material. The cellulose-based raw material may be a wood and/or wood-related material containing bark and/or needles. Preferably, the cellulose-containing raw material is a wood and/or wood related material containing pine wood or forestry residue. The use of a cellulose-containing raw material is advantageous because of low costs, easy handling and the possibility to achieve 100% non-food, non-ILUC products.

Pyrolysis is the thermal decomposition of a (renewable) material at a pyrolysis temperature of preferably 350° C. or more. The concentration of oxygen during pyrolysis is preferably less than the concentration required for complete combustion. More preferably, the pyrolysis is carried out in the essential absence of non-in-situ-generated oxygen (i.e. without intentional addition of oxygen). Some oxygen may be generated in-situ during the pyrolysis process. Preferably, pyrolysis is carried out in an atmosphere containing equal to or less than 5 vol. % oxygen, more preferably equal to or less than 1 vol. % oxygen and most preferably equal to or less than 0.1 vol. % oxygen.

The pyrolysis temperature is preferably 350° C. or more, more preferably 400° C. or more and further preferably 450° C. or more. The pyrolysis temperature may be 800° C. or less, preferably 700° C. or less or 650° C. or less. The pyrolysis pressure is not particularly limited. For practical purposes a pressure (absolute pressure) in the range from 0.1 to 5 bar (0.01 to 0.5 MPa), preferably in the range from 1 to 2 bar (0.1 to 0.2 MPa) can be used. For ease of process conditions and in view of apparatus construction, a pressure around atmospheric pressure is preferred (e.g. 1 bar±0.1 bar).

The pyrolysis liquid may be provided by so-called fast or flash pyrolysis of the renewable material. Such fast or flash pyrolysis preferably comprises rapidly heating the renewable material for a very short time and then rapidly reducing the temperature of the primary products before chemical equilibrium can occur.

In the present invention, the pyrolysis liquid may be provided by pyrolysis of the renewable material comprising the steps of
   heating the renewable material to a temperature equal to a pyrolysis temperature in the range of 350° C. to 800° C., preferably within 3 seconds or less (preferably 2 seconds or less, 1 second or less or 0.5 seconds or less);
   maintaining the renewable heated renewable material within the pyrolysis temperature range for between 0.03 and 2.0 seconds (preferably between 0.03 and 0.60 seconds) to produce one or more pyrolysis products;
   cooling the pyrolysis products to below 350° C. within 2 seconds or less, preferably within 1 second or less, or within 0.5 seconds or less;
   obtaining the pyrolysis liquid from the pyrolysis products.

Examples of suitable fast or flash pyrolysis processes to provide the pyrolysis liquid are described in A. Oasmaa et al, "Fast pyrolysis of Forestry Residue 1. Effect of extractives on phase separation of pyrolysis liquids", Energy & Fuels, volume 17, number 1, 2003, pages 1-12; and A. Oasmaa et al, Fast pyrolysis bio-oils from wood and agricultural residues, Energy & Fuels, 2010, vol. 24, pages 1380-1388; U.S. Pat. Nos. 4,876,108; 5,961,786; and 5,395,455, which are herein incorporated by reference.

After pyrolysis of the renewable material, the pyrolysis products may contain gas, solids (char), one or more oily phase(s), and an aqueous phase. The oily phase(s), optionally including water, may be employed as the pyrolysis liquid in the present invention. The pyrolysis liquid can be separated from the pyrolysis products by any known method. This includes methods such as filtration, centrifugation, cyclone separation, extraction, membrane separation and/or phase separation.

The pyrolysis liquid usually includes one or more of carbohydrates, olefins, paraffins, oxygenates (such as aldehydes and/or carboxylic acids) and water.

Preferably, the pyrolysis liquid comprises carbon in an amount equal to or more than 25 wt.-%, more preferably equal to or more than 35 wt.-%, and preferably equal to or less than 70 wt.-%, more preferably equal to or less than 60 wt.-% (on a dry basis; i.e. not including the water or after full removal of water).

The pyrolysis liquid further preferably comprises hydrogen in an amount equal to or more than 1 wt.-%, more preferably equal to or more than 5 wt.-%, and preferably equal to or less than 15 wt.-%, more preferably equal to or less than 10 wt.-% (on a dry basis).

The pyrolysis liquid further preferably comprises oxygen in an amount equal to or more than 25 wt.-%, more preferably equal to or more than 35 wt.-%, and preferably equal to or less than 70 wt.-%, more preferably equal to or less than 60 wt.-%. Such oxygen content is preferably defined on a dry basis.

The pyrolysis liquid may also contain nitrogen and/or sulphur. If nitrogen is present, the pyrolysis liquid preferably comprises nitrogen in an amount equal to or more than 0.001 wt.-%, more preferably equal to or more than 0.1 wt.-%, and preferably equal to or less than 1.5 wt.-%, more preferably equal to or less than 0.5 wt.-% (on a dry basis). If sulphur is present, the pyrolysis liquid preferably comprises sulphur in an amount equal to or more than 0.001 wt.-%, more preferably equal to or more than 0.01 wt.-%, and preferably equal to or more than 1 wt.-%, more preferably equal to or less than 0.1 wt.-% (on a dry basis).

The contents of carbon, hydrogen, oxygen, nitrogen, sulphur and other constituents of the pyrolysis liquid may be determined by elemental analysis.

The pyrolysis liquid preferably comprises water. The amount of water may be equal to or more than 0.1 wt.-%, equal to or more than 1.0 wt.-%, equal to or more than 5.0 wt.-%. Too much water, however, reduces the usability if the PL so that the amount of water is preferably equal to or less than 55 wt.-%, equal to or less than 45 wt.-%, equal to or less than 35 wt.-%, equal to or less than 30 wt.-%, or equal to or less than 25 wt.-%.

The pyrolysis liquid of the present invention may comprise aldehydes, specifically in an amount equal to or more than 5 wt.-%, equal to or more than 10 wt.-%, equal to or less than 30 wt.-%, or equal to or less than 20 wt.-%. The pyrolysis liquid may further comprise carboxylic acids, specifically in an amount equal to or more than 5 wt.-%, equal to or more than 10 wt.-%, and/or equal to or less than 25 wt.-%, or equal to or less than 15 wt.-%.

The pyrolysis liquid may comprise carbohydrates, specifically in an amount equal to or more than 1 wt.-%, equal to or more than 5 wt.-%, and/or equal to or less than 20 wt.-%, or equal to or less than 10 wt.-%.

The pyrolysis liquid may comprise phenols, specifically in an amount equal to or more than 0.1 wt.-%, equal to or more than 2 wt.-%, and/or equal to or less than 10 wt.-%, or equal to or less than 5 wt.-%.

Preferably, the pyrolysis liquid may comprise furfurals, specifically in an amount equal to or more than 0.1 wt.-%, equal to or more than 1.0 wt.-%, and/or equal to or less than 10.0 wt.-%, or equal to or less than 4.0 wt.-%.

In the present invention, a distillation residue from a tall oil distillation (also referred to as a tall oil distillation residue) is a residue fraction (bottom fraction) obtained after at least one distillation step in tall oil distillation. Specifically, the tall oil distillation residue may be obtained as a residue when distilling tall oil, preferably crude tall oil. It is specifically preferable that the tall oil distillation residue is tall oil pitch.

Typically, the tall oil distillation residue comprises several different components. In the present invention, the tall oil distillation residue preferably contains less than 80 wt.-%, less than 70 wt.-%, less than 60 wt.-%, or less than 50 wt.-% resin acids, fatty acids and esters thereof. Specifically, the distillation residue may comprise 23-38 wt.-% esters of fatty acids, together with different wood alcohols, and 15 wt.-% or less free carboxylic acids (primarily fatty acids and resin acids), and the remainder comprises different neutral materials, such as hydrocarbons (e.g. sterols) and wood alcohols.

The tall oil (crude tall oil) which is subjected to distillation to gain the distillation residue is preferably a lignocellulosic (oily) material obtained as a by-product from paper industry, specifically from a cellulosic pulp cooking process. It comprises resin acids, fatty acids, neutrals, mainly sterols, and alcohols, and esters of these alcohols and acids. Tall oil is usually refined by distillation at a low pressure. Primary oil, fatty acids and resin acids are recovered as a surplus of the distillation (heads or side stream), in addition to a distillation residue (which is mainly TOP). TOP in itself comprises alcohol esters of fatty and resin acids, oligomers of fatty and resin acids, phytosterols, high-boiling neutral matters such as spirits, hydrocarbons, etc. Conventionally, the use of TOP was limited, firstly by its high viscosity (about 3000 cP at 50° C.), and secondly, by the fact that TOP is never totally rigid. Consequently, it was considered as a low value waste material and used mainly in flaming torches, outdoor fire pots and similar objects. The present invention, however, found that a tall oil distillation residue (such as TOP) can be favourably used as a co-feed with PL in a conventional oil refinery conversion process and is suited to increase the yield of valuable refined products.

The fossil feed may be any conventional fossil-based feed usually employed in fuel refining (oil refining/conversion), e.g. in catalytic cracking, hydrocracking and/or hydrotreatment. Preferably, the fossil-based feed is a hydrocarbon feed. The fossil-based feed may be a fraction obtained from distillation of crude oil, preferably a heavy distillate fraction, a heavy-middle distillate fraction or a middle distillate fraction, or a derivative of crude oil or of a fraction thereof, such as a gas oil (GO) feed, a vacuum gas oil (VGO) feed, a heavy gas oil (HGO) feed, any other hydrocarbon feed or a Fischer-Tropsch wax, or any combination of two or more of the aforementioned.

In the present invention, the refined product is anything (liquid, solid, volatile) that leaves the oil refining conversion reactor in which the oil refining conversion process is carried out, except for the catalyst (if present).

Using the process of the present invention, it is possible to increase the renewable content of the refined product without the need to employ expensive chemicals, such as surfactants, to improve compatibility between the renewable PL feed and the fossil-based feed. In other words, due to the use of the distillation residue, PL and the fossil-based feed show improved compatibility (are more readily miscible e.g. in the form of a solution or emulsion), thus facilitating the oil refinery conversion process. Accordingly, it is preferable that at least a part of the distillation residue is pre-mixed with the PL before addition of the fossil-based feed.

The distillation residue from tall oil distillation is preferably tall oil pitch (TOP). In the prior art, TOP was considered mainly as a waste product (or low value product) so that its use does not reduce the amount of other (valuable) products obtained from (crude) tall oil.

In the process of the present invention, the ratio of the pyrolysis liquid to the distillation residue (pyrolysis liquid:distillation residue) is preferably in the range of 5:1 to 1:19 by weight.

The ratio of the pyrolysis liquid to the distillation residue is defined as parts of PL in relation to parts of distillation residue. In other words a ratio of the pyrolysis liquid to the distillation residue (pyrolysis liquid:distillation residue) 1:19 by weight means a mixture containing 1 wt.-part PL and 19 wt.-parts distillation residue (5 wt.-% of PL and 95 wt.-% of distillation residue provided that the sum of PL and distillation residue is 100 wt.-%, i.e. in case of a mixture consisting of PL and distillation residue).

Employing the pyrolysis liquid and the distillation residue within this range allows achieving good yields of valuable transportation fuel components. The ratio pyrolysis liquid:distillation residue is preferably 4:1 by weight or lower, 2:1 by weight or lower, or 1:1 by weight. Further, the ratio is preferably 1:7 by weight or higher, preferably 1:10 by weight or higher, 1:7 by weight or higher, 1:5 by weight or higher, 1:4 by weight or higher or 1:3 by weight or higher. Using these ratios can provide particularly good results.

The ratio of the pyrolysis liquid to the fossil-based feed (pyrolysis liquid:fossil-based feed) is preferably in the range of 5:1 to 1:20 by weight. The ratio may be 2:1 by weight or lower, preferably 1:1 by weight or lower, or 1:2 by weight or lower. Further, the ratio of the pyrolysis liquid to the fossil-based feed (pyrolysis liquid:fossil-based feed) may be 1:15 by weight or higher, preferably 1:12 by weight or higher, 1:10 by weight or higher or 1:8 by weight or higher.

The total content of the pyrolysis liquid and the distillation residue is preferably in the range of 1.0 to 80.0 wt.-% based on the whole feedstock. The total content is particularly preferably at least 1.5 wt.-%, at least 2.0 wt.-%, at least 3.0 wt.-%, at least 4.0 wt.-%, at least 5.0 wt.-%, at least 6.0 wt.-%, at least 7.0 wt.-%, or at least 7.5 wt.-% based on the whole feedstock. Further, a total content of pyrolysis liquid and the distillation residue is preferably 50.0 wt.-% or less, 40.0 wt.-% or less, or 30.0 wt.-% or less based on the whole feedstock.

Further, it is preferable that the total content of the fossil-based feed, the pyrolysis liquid and the distillation residue is in the range of 10.0 to 100.0 wt.-% based on the whole feedstock. The total content of the fossil-based feed, the pyrolysis liquid and the distillation residue is particularly preferably at least 50.0 wt.-%, at least 70.0 wt.-%, at least 80.0 wt.-%, at least 90.0 wt.-%, or at least 95.0 wt.-%.

In this respect, the feedstock used herein includes any liquid feed, which is fed to the reactor, e.g. the PL, the distillation residue, the fossil-based feed, an optional recycle stream (recycled product), but excluding the (solid) catalyst.

The remainder of the feedstock (if the total content of fossil-based feed, pyrolysis liquid and distillation residue is less than 100%) may be any suitable feed, such as a recycle stream (recycled product fraction) or another (non-pyrolysis) renewable feed.

In the present invention, when the process comprises at least a catalytic cracking process as the oil refinery conversion process, a solid catalyst employed in the catalytic cracking process of this embodiment is preferably a particulate catalyst. Employing a particulate catalyst allows easy handling and easy recycling of the catalyst. Due to such an easy handling and easy recycling procedure, the catalyst is particularly suitable in a fluid catalytic cracking process.

The particulate catalyst preferably has a particle size below 1 cm (longest diameter), more preferably at most 1 mm, at most 500 µm, at most 200 µm, at most 100 µm, as measured by an optical method. Use of these subranges can provide particularly good results and allow easy handling.

In the catalytic cracking process, the solid catalyst is preferably an acidic catalyst. Employing an acidic catalyst allows achieving good catalytic efficiency in the catalytic cracking process. The acidic catalyst is preferably a catalyst having acid sites. Such an acidic catalyst can be, for example, an oxide-based material containing Brønsted and/or Lewis acid sites. Employing such an acidic catalyst can provide particularly good catalytic efficiency in the catalytic cracking process.

The catalyst employed in the catalytic cracking process is more preferably a zeolite-based catalyst. Employing a zeolite-based catalyst in the catalytic cracking process allows to achieve excellent catalytic efficiency in the catalytic cracking process. As a zeolite-based catalyst, any commercially available and/or known zeolite-based catalyst can be used. The zeolite-based catalyst may further comprise a binder, a matrix, a filler, metals, additional reactive sites or the like.

The catalytic cracking process is preferably carried out at a temperature in a range of 400° C. to 600° C.

Carrying out the catalytic cracking process within this range allows the provision of a suitable temperature range for catalytic cracking. Using the PL and the tall oil distillation residue as a feed, it was found that low cracking temperatures can be used, thus allowing cracking while avoiding excessive side reactions. The temperature is preferably 420° C. or more, more preferably 440° C. or more, 450° C. or more, 460° C. or more or 470° C. or more. Further, the temperature is preferably 570° C. or less, preferably 550° C. or less, 540° C. or less, 530° C. or less, 525 or less, or 520° C. or less. Use of these ranges can provide particularly good results.

The catalytic cracking process is preferably carried out as a continuous process. Using a continuous process provides the advantage that there is no need to change the reaction conditions. Due to this, an easy handling and very good results can be achieved.

The catalytic cracking process is preferably a fluid catalytic cracking (FCC) process. Use of a FCC process allows easy handling and high throughput which results in an advantageous particularly high yield.

The catalytic cracking process is preferably carried out in a transported bed reactor or in a fluidized bed reactor.

In catalytic cracking process, the catalyst-to-oil-ratio is preferably 3 or more. The catalyst-to-oil-ratio is preferably 4 or more, or 5 or more. The catalyst-to-oil-ratio is preferably 20 or less, 15 or less, or 10 or less. The catalyst-to-oil-ratio is defined as the hourly feed of the catalyst per hourly feed of the feedstock. In a non-continuous process, this is equivalent to the total amount of catalyst divided by the total amount of feedstock. In this respect, the feedstock refers to the total liquid feed, i.e. including the PL, the tall oil distillation residue, optionally recycled product, optionally other liquid side feeds (such as fossil fractions). The feedstock does not include the solid catalyst.

Employing the catalyst-to-oil-ratio within the above-mentioned range has shown to give good results.

In the catalytic cracking process, the used catalyst is preferably recycled into the reactor, preferably after regeneration outside the cracking reactor.

In the present invention, when the process comprises at least a hydrocracking process as the oil refinery conversion process, any suitable process may be employed.

Although it is preferable to employ the respective feed components, especially the PL, as such, so as to minimize the complexity of the process, at least one, two or all of the feeds introduced into the hydrocracking reaction may be de-watered before being fed to the reactor. De-watering may be achieved using conventional means, e.g. using an absorbent, and absorbent or using physical means such as distillation/evaporation. Distillation/evaporation is preferred.

Hydrocracking may be conducted in the presence of a hydrocracking catalyst. The hydrocracking catalyst is preferably a heterogeneous catalyst, in particular a particulate heterogeneous catalyst.

The hydrocracking catalyst is preferably a catalyst comprising one or more metals of group VIII of the periodic table and/or one or more metals metal of group VIB of the periodic table. For example the hydrocracking catalyst may comprise a metal selected from the group comprising nickel, palladium, molybdenum, tungsten, platinum, cobalt, rhenium and/or ruthenium. Most preferably the hydrocracking catalyst is a nickel/tungsten comprising catalyst, a nickel/molybdenum comprising catalyst, cobalt/tungsten comprising catalyst or cobalt/molybdenum comprising catalyst. Suitably the above mentioned metals may be present in an alloy or oxide form.

Preferably, the catalyst hydrocracking further comprises a support, which may be used to carry (support) the metal element or elements (including elemental metals/alloys and oxides).

Examples of suitable supports include metal oxides, such as alumina, silica, silica-alumina, zirconia, titania, and/or mixtures thereof. The support may comprise a zeolite, but preferably comprises amorphous alumina, silica or silica-alumina. Most preferably, the catalyst comprises one or more oxides of molybdenum, cobalt, nickel and/or tungsten on a carrier comprising amorphous alumina, silica or silica-alumina.

The catalyst may be a so-called extruded catalyst, prepared by extrusion of its components.

The catalyst is preferably a sulphided catalyst. The catalyst may be sulphided in-situ or ex-situ. The catalyst may be sulphided in-situ or its sulphidation is maintained in-situ by contacting it with a feed stream that comprises sulphur, preferably in the form of hydrogensulphide, for example a stream of hydrogen that contains in the range from 0.1 to 10 wt.-% hydrogensulphide based on the total weight of the stream of hydrogen.

In addition to a heterogeneous catalyst or instead of a heterogeneous catalyst, also a colloidal or dispersed catalyst may be used. Such a colloidal or dispersed catalyst may be formed in-situ by mixing one or more catalyst precursors in the feed in such a manner that a colloidal or dispersed catalyst is formed within the hydrocracking reactor.

The hydrocracking reactor preferably comprises at least one fixed bed reactor or at least one ebullating bed reactor.

In the present invention, when the process comprises at least a hydrotreatment process as the oil refinery conversion process, the hydrotreatment may for example be a hydrogenation for sulphide removal (hydrodesulphurisation), a hydrogenation for achieving saturation, a hydrogenation for oxygen removal (hydrodeoxygenation) or a combination thereof. The hydrotreatment may be conducted in the presence of a catalyst, preferably a heterogeneous catalyst, and any known catalyst may be employed.

The oil refinery conversion process of the present invention is, however, not limited to the above-exemplified catalytic cracking, hydrocracking or hydrotreatment process. Rather, the present invention is applicable to any (conventional) oil refinery conversion process in which the use of renewable raw materials shall be increased, in particular to any process which is applicable for refining heavy hydrocarbon feeds, such as VGO. It is further possible to combine two or more (conventional) oil refinery conversion processes and use these as the oil refinery conversion process of the present invention. For example, the oil refinery conversion process may be a combination of catalytic cracking and subsequent hydrotreatment.

The fossil-based feed, the PL and the distillation residue may be introduced into the oil refinery conversion reactor, in which the oil refinery conversion process is carried out, using different feeding lines. When adding the fossil-based feed, the PL and the distillation residue using different feed lines, it is easier to achieve good process control, specifically temperature control.

When the oil refinery conversion process comprises at least a continuous catalytic cracking process, the energy required for cracking is usually provided by heated catalyst. Thus, the temperature is highest near the inlet of the catalyst. In case a feed is easily degraded by excessively high temperatures, injecting this feed at a later position (more remote from the catalyst inlet) can reduce coking. Similarly, when the oil refinery conversion process comprises a hydrocracking process, a hydrotreatment process or another oil refining conversion process, introducing the respective feeds (at least partially) via separate feed lines allows easier process control.

Further, two or all out of the fossil-based feed, the PL and the distillation residue may be introduced into the oil refinery conversion reactor, in which the oil refinery conversion process is carried out, using the same feeding line. Such a procedure facilitates feeding. It is also possible to combine these approaches, e.g. feed a mixture of PL and the distillation residue using one single feeding line and in addition feeding one, two or all of the fossil-based feed, the (remaining) PL and the (remaining) distillation residue using additional (separate) feeding line(s).

When PL and distillation residue are fed using the same feeding line, it is possible that the PL and the distillation residue are mixed in advanced in a mixing vessel and then introduced into the oil refinery conversion reactor. Thus, thorough mixing can be achieved. For the same reason, it can be favourable to pre-mix all of fossil-based feed (e.g. a petroleum fraction/raw oil distillation fraction), PL and distillation residue in advance.

In addition, another renewable feed (or fraction) may be fed to the oil refinery conversion reactor and co-processed together with the fossil-based fraction, the PL and the distillation residue. The other (further) renewable feed and the PL may be introduced into the oil refinery conversion reactor using different feeding lines and/or using the same feeding line. Similarly, the further renewable feed and the distillation residue from tall oil distillation may be introduced into the oil refinery conversion reactor using different feeding lines and/or using the same feeding line. Finally, the further renewable feed and the fossil-based feed may be introduced into the oil refinery conversion reactor using different feeding lines and/or using the same feeding line. An appropriate way of feeding the respective fractions depends on the actual processing conditions and the required temperature control. The further renewable fraction may be mixed, in advance (i.e. before introduction into the oil refinery conversion reactor), with the fossil-based feed, with the distillation residue, with the PL, with a mixture of the fossil-based feed and the distillation residue, with a mixture of the fossil-based feed and the PL, with a mixture of the distillation residue and the PL, or with a mixture of the fossil-based feed, the distillation residue and the PL.

The process of the present invention preferably further comprises a step for fractionating the product of the oil refinery conversion process (hereinafter sometimes referred to as "refined product") to provide at least a gasoline fraction and a middle distillate fraction. These fractions are the most valuable for traffic fuels and thus separating these fractions from less valuable fractions is favourable. In addition to a gasoline stream and a middle distillate stream, the fractions derived from the fractionation may comprise a gas stream and a distillation bottom. The fractionation may comprise any suitable distillation means, including distillation at normal pressure or distillation or evaporation under reduced pressure.

In the context of the present invention, the "oil refinery conversion process" is to be understood as a process which alters the molecular composition of the feed stream (i.e. fossil-based feed, PL and distillation residue) or its components, whereas fractionation (which does not alter the molecular composition) is not to be understood as an "oil refinery conversion process" within the meaning of the present invention although it may be employed in addition to the oil refinery process (non-conversion oil refinery process) and even between sub-stages of the oil refinery conversion process.

The refined product, or a fraction thereof, may optionally further be subjected optional further processing (while this further processing may comprise one or more further oil refinery conversion processes). This further processing may comprise one or two or more of isomerization, hydrotreatment, hydrocracking, etherification, alkylation and oxidation. Moreover, fractionation and/or other oil refinery non-conversion process(es) may be carried out after and/or during the further processing, preferably at least after isomerization, as the only fractionation process or in addition to a previous and/or subsequent fractionation process. Specifically, it is preferred that the refined product (preferably a catalytic cracking product) is fractionated to produce at least a gas fraction, a gasoline fraction a middle distillate fraction, and a heavy-end fraction, wherein the average boiling point range of the fractions increases in the order gas fraction<gasoline fraction<middle distillate fraction<heavy-end fraction. The abovementioned four fractions can be further divided into sub-fractions. It is preferred that the fractions are further refined using different oil refinery conversion processes.

The present invention further relates to a fuel component obtainable by the process of the present invention. The fuel component may be a transportation fuel component. The fuel component may be used as a fuel as it is or may be blended with other fuel components (renewable and/or petroleum fuel components) to get a fuel.

The process of an embodiment of the present invention results in a specific composition of the refined product due to the unique combination of fossil-based feed, PL and distillation residue from tall oil. That is, the present invention provides a fuel component having a specific chemical composition.

The fuel component may be composed of the refined product as a whole (i.e. the directly obtained refined product without further processing and without being subjected to a further non-conversion process), the refined product after an optional purification, or a fraction of the refined product obtained after e.g. distillation, evaporation and/or fractionation. Preferably, the refined product is at least purified by removal of water. The fuel component preferably comprises a fraction of the refined product. Most preferably, water is removed in a first stage, e.g. by evaporation or distillation, and the de-watered refined product is further subjected to fractionation to yield the fuel component.

The fraction of the refined product is preferably a fraction boiling in the gasoline range and/or in the middle distillate range, preferably in only one of these ranges.

The present invention further relates to a mixture comprising at least a fossil-based material, a pyrolysis liquid and a distillation residue from tall oil distillation. The materials (i.e. the type of fossil-based material, pyrolysis liquid and/or distillation residue), their relative and absolute contents in the mixture and their mixing ratios as well as their application (use) is/are preferably the same as in above-described process of the present invention. This mixture provides a suitable raw material (feed) in which the fossil-based material, the pyrolysis liquid and the distillation residue from tall oil distillation are enhanced in their compatibility and thus can be employed in various processes in which an increased amount of renewable material is desirable. Further, due to the compatibility of the ingredients, co-processing of these ingredients can be easily accomplished without the need to employ compatibilizers (such as surfactants).

The present invention further relates to a use of a refined product or of a fraction thereof obtained by the process of the present invention for producing a fuel or a fuel component. The use may include water removal and/or fractionation and/or other purification.

Further, the invention relates to a method of producing a fuel comprising producing a refined product as defined above, optionally fractionating the refined product to provide a refined product fraction, and blending the refined product or the refined product fraction with another fuel component to provide a fuel. The method for producing a fuel may further comprise an optional purification of refined product or of the fraction thereof.

EXAMPLES

The present invention is further illustrated by way of Examples. However, it is to be noted that the invention is not intended to be limited to the exemplary embodiments presented in the Examples.

Compatibility (miscibility) and phase stability of VGO/PL and compatibility (miscibility) of TOP/VGO/PL was studied in two separate experiments at laboratory scale. Fossil VGO (vacuum gas oil), renewable LPL (lignocellulose pyrolysis liquid) and (renewable) TOP (tall oil pitch) were used in the Examples. The properties (density and sulphur content) of these components are shown in Table 1.

TABLE 1

|  | Density (60° C.) (g/ml) | Sulphur content (ppm) |
| --- | --- | --- |
| TOP | 0.96 | 4270 |
| LPL | 1.16 | 72 |
| VGO | 0.86 | 800 |

Comparative Example 1

20 wt.-% of the LPL and 80 wt.-% of the VGO were added into round bottom flask and agitated with a magnetic stirrer while heating from room temperature to 60° C. When a temperature of 60° C. was reached, the agitation was terminated and phase separation was monitored visually. Further, after a given separation time shown in Table 2, samples were taken (without performing mixing) from the top of the flask (surface) and from the bottom of the flask and the density and sulphur content of these samples was analysed. The variations in density and sulphur content are a measure for the degree of phase separation. The results are shown in Table 2.

Example 1

10 vol.-% TOP, 10 vol.-% LPL and 80 vol.-% VGO were mixed in the same manner as in Comparative Example 1. Further, the same evaluation as described in Comparative Example 1 was carried out. The results are shown in Table 2.

TABLE 2

|  | 2 h | 5 h |
| --- | --- | --- |
| 20% LPL/80% VGO (Comparative Example 1) | | |
| Surface Density (60° C.), kg/m$^3$ | 0.86 | 0.86 |
| Bottom Density (60° C.), kg/m$^3$ | 1.18 | 1.18 |
| Surface Sulphur content, ppm | 875 | 855 |
| Bottom Sulphur content, ppm | 52 | 51 |
| 10% LPL/10% TOP/80% VGO (Example 1) | | |
| Surface Density (60° C.), kg/m$^3$ | 0.87 | 0.87 |
| Bottom Density (60° C.), kg/m$^3$ | 0.87 | 0.87 |
| Surface Sulphur content, ppm | 1050 | 1062 |
| Bottom Sulphur content, ppm | 1054 | 1069 |

As can be seen from Table 2, in the case of the mixture of Comparative Example 1, a clear separation of the ingredients occurs, while the bottom fraction consists mainly of LPL components and the top fraction consists mainly of the VGO components. The same results were obtained from the visual inspection, which showed a clear phase separation into two phases.

On the other hand, the homogenous appearance of the three component blend of Example 1 was apparent from visual inspection and was confirmed from the measurement of density and sulphur content. The measured sulphur content of the three component blend very closely matches the weighted average sulphur content of the three individual blend components (1074 ppm).

Accordingly, it was confirmed that a distillation residue from tall oil distillation (TOP) is suited to significantly increase the compatibility of a pyrolysis liquid (LPL) with fossil-based material (VGO), which thus enables efficient co-processing thereof. It was further confirmed that this mixture remains homogeneous over a long time even at elevated temperature.

Comparative Example 2

Comparative Example 2 was carried out in exactly the same manner as Example 1, but TOP was replaced with a palm fatty acid distillate (PFAD) which had a density of 0.86 kg/m$^3$ at 60° C.

It was observed that already after 2 hours, the sample which was withdrawn from the bottom of the flask had separated into two distinct phases (upper and lower phase). The upper phase had a density of 0.87 kg/m$^3$ whereas the lower phase had a density of 1.19 kg/m$^3$. An additional sample which was withdrawn from the surface of the flask also had a density 0.87 kg/m$^3$. Thus, one can conclude that the three component blend which was prepared using PFAD exhibited inferior homogeneity characteristics compared to the blend which comprised TOP. This was evident by the fact that a high density LPL-rich phase had separated at the bottom of the flask.

Comparative Example 3

Comparative Example 3 was carried out in exactly the same manner as Example 1, but TOP was replaced with animal fat (AF) which had a density of 0.88 kg/m$^3$ at 60° C.

It was observed that already after 2.5 hours, the sample which was withdrawn from the bottom of the flask had separated into two distinct phases. The amount of the upper phase was too small to perform a density measurement, but the lower phase had a density of 1.18 kg/m$^3$. The additional sample which was withdrawn from the surface of the flask had a density 0.87 kg/m$^3$. Thus, one can conclude that also the three component blend which was prepared using AF exhibited inferior homogeneity characteristics compared to the blend which comprised TOP.

The invention claimed is:

1. A process comprising:
   co-processing at least a fossil-based feed, pyrolysis liquid (PL) and a distillation residue from tall oil distillation in an oil refinery conversion process,
   wherein a ratio of the pyrolysis liquid to the fossil-based feed (pyrolysis liquid:fossil-based feed) is 1:2 by weight or lower; and
   wherein the fossil-based feed, the pyrolysis liquid (PL) and the distillation residue form a homogenous blend that is co-processed.

2. The process according to claim 1, wherein the distillation residue from tall oil distillation is a tall oil pitch (TOP).

3. The process according to claim 1, comprising:
   deriving the pyrolysis liquid from a cellulose-containing raw material.

4. The process according to claim 1, wherein the fossil-based feed is at least one of:
   a pre-treated crude oil distillation fraction, a gas oil (GO), a vacuum gas oil (VGO), a Fischer-Tropsch wax, and a mixture of at least two thereof.

5. The process according to claim 1, wherein a ratio of the pyrolysis liquid to the distillation residue (pyrolysis liquid: distillation residue) is selected to be in a range of at least one of:
   5:1 to 1:19 by weight, 4:1 by weight or lower, 2:1 by weight or lower, 1:1 by weight or lower; 1:7 by weight or higher, 1:5 by weight or higher, 1:4 by weight or higher, and 1:3 by weight or higher.

6. The process according to claim 1, wherein a total content of the pyrolysis liquid and the distillation residue is selected to be in a range of at least one of:

1.0 to 80.0 wt.-% based on the whole feedstock, at most 50.0 wt.-%, at most 40.0 wt.-% and at most 30.0 wt.-%.

7. The process according to claim 1, wherein a total content of the fossil-based feed, the pyrolysis liquid and the distillation residue is selected to be in a range of at least one of:
10.0 to 100.0 wt.-% based on the whole feedstock, at least 50.0 wt.-%, at least 70.0 wt.-%, at least 80.0 wt.-%, at least 90.0 wt.-%, and at least 95.0 wt.-%.

8. The process according to claim 1, comprising:
introducing the PL, the fossil-based feed and the distillation residue into an oil refinery conversion reactor, in which the oil refinery conversion process is carried out using different feeding lines.

9. The process according to claim 1, comprising:
introducing at least two of the PL, the fossil-based feed and the distillation residue into an oil refinery conversion reactor, in which the oil refinery conversion process is carried out using a same feeding line.

10. The process according to claim 9, comprising:
introducing the PL and the distillation residue into the oil refinery conversion reactor, in which the oil refinery conversion process is carried out, using the same feeding line; and
introducing the fossil-based feed using a different feeding line.

11. The process according to claim 10, comprising:
mixing the PL and the distillation residue to form a mixture in advance in a mixing vessel: and
introducing the mixture into the oil refinery conversion reactor.

12. The process according to claim 11, comprising:
individually introducing a part of one or both of the PL and the distillation residue into the oil refinery conversion reactor using a separate feeding line.

13. The process according to claim 1, wherein the oil refinery conversion process comprises at least one of:
altering a molecular weight of the feed;
removing heteroatoms from the feed;
altering a degree of saturation of the feed;
rearranging the molecular structure of the feed; and
any combination thereof.

14. The process according to claim 1, wherein the oil refinery conversion process comprises at least one of:
a catalytic cracking process;
a hydrotreating process; and
a hydrocracking process.

15. The process according to claim 1, comprising:
fractionating a product of the oil refinery conversion process to provide at least a gasoline fraction and a middle distillate fraction.

16. The process according to claim 1, wherein at least a part of the distillation residue is pre-mixed with the pyrolysis liquid (PL) before addition of the fossil-based feed.

17. The process according to claim 1, wherein the pyrolysis liquid (PL) is derived from a renewable material.

18. The process according to claim 1, wherein the pyrolysis liquid (PL) comprises water.

19. The process according to claim 18, wherein the water is at an amount equal to or more than 0.1 wt.-%, or equal to or more than 1.0 wt.-%; and equal to or less than 55 wt-%.

* * * * *